(12) United States Patent
Gunia et al.

(10) Patent No.: US 10,830,293 B2
(45) Date of Patent: Nov. 10, 2020

(54) TORQUE LIMITER ASSEMBLY

(71) Applicant: Goodrich Actuation Systems Limited, Wolverhampton (GB)

(72) Inventors: Dominik Gunia, Szczytna (PL); Marcin Cis, Lutynia (PL)

(73) Assignee: GOODRICH ACTUATION SYSTEMS LIMITED, Wolverhampton (GB)

(*) Notice: Subject to any disclaimer, the term of this patent is extended or adjusted under 35 U.S.C. 154(b) by 190 days.

(21) Appl. No.: 15/964,478

(22) Filed: Apr. 27, 2018

(65) Prior Publication Data

US 2019/0010998 A1  Jan. 10, 2019

(30) Foreign Application Priority Data

Jul. 8, 2017 (EP) .................................... 17461565

(51) Int. Cl.
*F16D 43/20* (2006.01)
*F16D 43/202* (2006.01)
*F16D 27/09* (2006.01)
*F16D 7/04* (2006.01)
*F16D 7/02* (2006.01)
*F16D 27/118* (2006.01)

(52) U.S. Cl.
CPC ......... *F16D 43/2028* (2013.01); *F16D 7/021* (2013.01); *F16D 7/046* (2013.01); *F16D 27/09* (2013.01); *F16D 27/118* (2013.01); *F16D 43/20* (2013.01); *F16D 2500/1022* (2013.01); *F16D 2500/3022* (2013.01)

(58) Field of Classification Search
CPC .. F16D 43/2024; F16D 63/006; F16D 63/002; F16D 11/14; F16D 27/09; F16D 2500/1022; F16D 7/044
See application file for complete search history.

(56) References Cited

U.S. PATENT DOCUMENTS 3,084,776 A * 4/1963 Rabinow ................. F16D 11/14
192/109 R
3,091,316 A * 5/1963 Huffman ............... F16D 27/118
192/150

(Continued)

FOREIGN PATENT DOCUMENTS

DE   3224759 A1 * 1/1984 ........... F16D 27/004
DE   3224759 A1   1/1984
GB   1217159 A    12/1970

OTHER PUBLICATIONS

Extended European Search Report for International Application No. 17461565.8 dated Jan. 24, 2018, 6 pages.

*Primary Examiner* — Stacey A Fluhart
(74) *Attorney, Agent, or Firm* — Cantor Colburn LLP

(57) ABSTRACT

A torque limiter assembly is disclosed comprising a housing having at least one first engagement member, an input shaft that is rotatable relative to the housing and having at least one second engagement member; and an electromagnet. The electromagnet 10 is arranged and configured such that when activated it generates a magnetic field that moves the at least one first engagement member relative to the at least one second engagement member, such that the first and second engagement members engage each other and stop or inhibit rotation of the input shaft relative to the housing.

9 Claims, 1 Drawing Sheet

(56) References Cited

U.S. PATENT DOCUMENTS

| | | | | |
|---|---|---|---|---|
| 3,331,481 A | * | 7/1967 | Wrensch | F16D 27/09 |
| | | | | 192/90 |
| 3,400,797 A | * | 9/1968 | Horn | F16D 55/02 |
| | | | | 192/90 |
| 3,650,362 A | * | 3/1972 | Davidson | F16D 27/04 |
| | | | | 192/56.42 |
| 3,917,042 A | * | 11/1975 | Summa | B23Q 16/08 |
| | | | | 192/84.92 |
| 4,189,042 A | | 2/1980 | Miller | |
| 4,905,805 A | | 3/1990 | Grimm | |
| 5,330,039 A | * | 7/1994 | Baker | F16D 27/118 |
| | | | | 192/30 W |
| 2011/0290055 A1 | | 12/2011 | Hielkema | |
| 2013/0126292 A1 | | 5/2013 | Lin | |
| 2014/0097058 A1 | * | 4/2014 | Yang | F16D 43/21 |
| | | | | 192/55.2 |
| 2014/0128220 A1 | * | 5/2014 | Swales | F16D 63/00 |
| | | | | 477/92 |
| 2015/0068862 A1 | * | 3/2015 | Fujii | F16D 11/14 |
| | | | | 192/84.9 |
| 2015/0345566 A1 | * | 12/2015 | Hosokawa | F16D 23/04 |
| | | | | 192/66.1 |

* cited by examiner

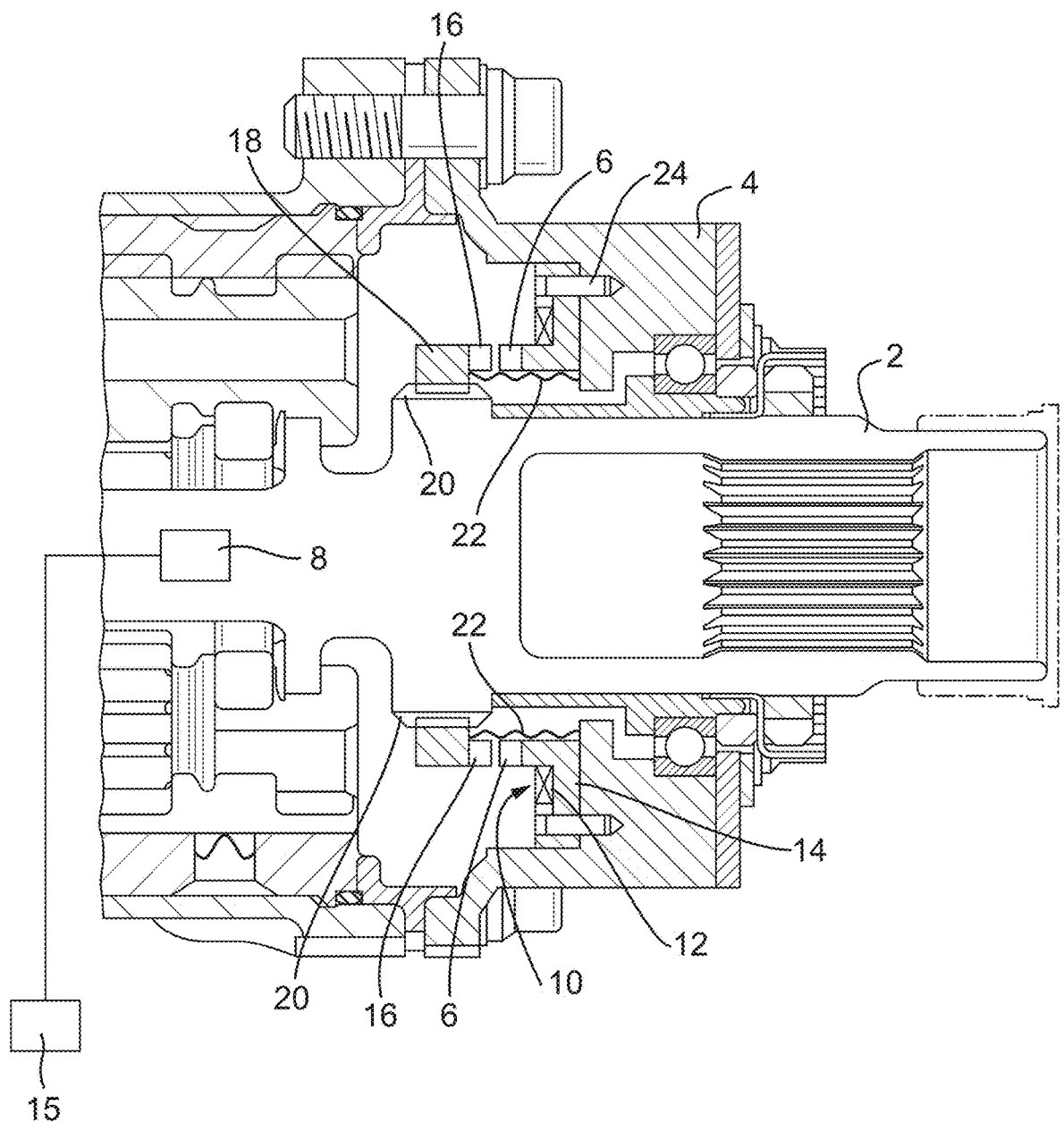

TORQUE LIMITER ASSEMBLY

FOREIGN PRIORITY

This application claims priority to European Patent Application No. 17461565.8 filed Jul. 8, 2017, the entire contents of which is incorporated herein by reference.

FIELD

The present disclosure relates generally to an assembly for limiting the amount of torque delivered by a drive shaft to a driven shaft.

BACKGROUND

It is known to use torque limiters in systems where a drive shaft (input shaft) drives a driven shaft (output shaft) in order to prevent excessive torque being applied to the driven shaft. Such excessive torque may result in damage to the apparatus. Conventional systems include components located on, or coupled to the drive shaft, and that move into engagement with an outer earth ring or housing when the torque becomes excessive, thereby halting or resisting rotation of the drive shaft.

SUMMARY

The present disclosure provides a torque limiter assembly comprising: a housing having at least one first engagement member; an input shaft that is rotatable relative to the housing and having at least one second engagement member; and an electromagnet; wherein the electromagnet is arranged and configured such that when activated it generates a magnetic field that moves the at least one first engagement member relative to the at least one second engagement member, such that the first and second engagement members engage each other and stop or inhibit rotation of the input shaft relative to the housing.

The at least one first engagement member may be at least one first projection mounted on the housing and/or the at least one second engagement member may be at least one second projection mounted on the input shaft.

The at least one first projection may project in a first direction along a rotational axis of the input shaft and the at least one second projection may project in a second opposite direction along a rotational axis of the input shaft.

The at least one first projection and the at least one second projection may be arranged at substantially the same radial distance from a rotational axis of the input shaft.

The at least one first projection may comprise a first plurality of projections arranged on the housing spaced circumferentially around a rotational axis of the input shaft, and/or the at least one second projection may comprise a second plurality of projections arranged on the input shaft spaced circumferentially around the rotational axis of the input shaft.

The at least one first projection may be a first plurality of teeth mounted on the housing, and the at least one second projection may be a second plurality of teeth mounted on the input shaft.

The at least one second engagement member may be mounted to the input shaft such that it is movable relative to the input shaft by the electromagnet, when activated, so as to move into engagement with the at least one first engagement member; or the at least one first engagement member may be mounted to the housing such that it is movable relative to the housing by the electromagnet, when activated, so as to move into engagement with the at least one second engagement member.

The at least one first engagement member and/or the at least one second engagement member may be moveable in a direction along a rotational axis of the input shaft.

The assembly may comprise a biasing member configured to bias the at least one first engagement member away from the at least one second engagement member.

The biasing member may be a spring coupled at a first of its ends to the housing (or to the at least one first engagement member), and at a second of its ends to the at least one second engagement member (or the input shaft).

The spring may be an annular spring arranged around the input shaft.

The assembly may comprise a torque sensor for sensing the level of torque in the input shaft or in another component coupled to the input shaft, and a controller configured to activate the electromagnet when the level of torque sensed by the torque sensor rises to (or above) a pre-selected level.

The controller may be configured to deactivate the electromagnet when the level of torque sensed by the torque sensor decreases to, or below, a pre-selected level.

BRIEF DESCRIPTION OF THE DRAWINGS

Various embodiments will now be described, by way of example only, and with reference to the accompanying drawing which:

FIG. 1 shows a cross-sectional view of a torque limiter assembly according to an embodiment of the present disclosure.

DETAILED DESCRIPTION

FIG. 1 shows a schematic of a torque limiting assembly according to an embodiment of to the present disclosure. The assembly comprises an input shaft 2 (i.e. drive shaft) that is mounted within a housing 4 such that the input shaft 2 is rotatable about its longitudinal axis. The input shaft 2 is coupled to an output shaft (i.e. a driven shaft), which is not shown, such that rotation of the input shaft 2 can drive rotation of the output shaft. The housing 4 comprises at least one first engagement member 6, which in the illustrated embodiment is at least one projection 6. The at least one projection is in the form of a first plurality of teeth members 6 that project in a first direction parallel to the longitudinal rotational axis of the input shaft 2. Although only two of these teeth 6 are shown in FIG. 1, further teeth may be provide that are arranged on the housing spaced circumferentially around the input shaft 2. These teeth 6 are fixed to the housing 4 such that they cannot move circumferentially relative to the housing 4.

The assembly also comprises a torque sensor 8 for sensing the level of torque in the assembly and an electromagnet 10 arranged on the housing 4. The electromagnet 10 comprises a wire coil 12 arranged around the input shaft 2 and in the vicinity of the first plurality of teeth 6 on the housing. The wire 12 may be would around a magnetic material 14 (e.g. ferromagnetic material) such as a ferrous material for concentrating the magnetic flux from the wire 12. The electromagnet 10 also comprises a voltage supply (not shown) for applying an electrical current in the coil 12. The assembly also comprises a controller 15 for controlling the voltage supply based on the level of torque sensed by the torque sensor 8.

At least one second engagement member 16 is mounted on the circumferential surface of the input shaft 2 by one or more mounting 18. In the illustrated embodiment the at least one second engagement member is at least one projection 16. The at least one projection is in the form of a second plurality of teeth 16. These teeth project in a second direction parallel to the longitudinal axis of the input shaft 2. Although only two of these teeth 16 are shown in FIG. 1, further teeth may be provide that are arranged on the input shaft 2 spaced circumferentially around the input shaft 2. These teeth 16 are mounted to the input shaft 2 such that they cannot move circumferentially relative to the input shaft 2. However, the teeth 16 are mounted to the input shaft 2 by the one or more mounting 18 such that they can move back and forth along the longitudinal axis of the input shaft 2. For example, the one or more mounting 18 may be movable along a spline 20 that runs along the rotational axis of the input shaft 2. The teeth 16 and/or one or more mounting 18 may be formed from a material that is capable of being attracted by a magnetic field, e.g. a ferrous or ferromagnetic material.

The first plurality of teeth 6 and second plurality of teeth 16 are arranged at substantially the same radial distance from the rotational, longitudinal axis of the input shaft 2.

The assembly also comprises a resilient biasing member 22 that biases the second plurality of teeth 16 away from the first plurality of teeth 6. One part of the resilient biasing member 22 may be coupled to the housing 4 and another part may be coupled to the second plurality of teeth 16 so as to exert a biasing force that urges the second plurality of teeth 16 away from the first plurality of teeth 6. For example, the resilient biasing member may be one or more spring 22. Alternatively, the resilient biasing member 22 may be a material that biases by resisting compression due to its constitution rather than its configuration, such as a polymer. In the embodiment shown in FIG. 1, the resilient biasing member is an annular spring 22 arranged around the input shaft 2. A first end of the spring 22 contacts the housing 4 and the second end of the spring 22 contacts the movable mounting 18 that mounts the second plurality of teeth 16 on the input shaft 2. The spring 22 is arranged and configured to bias the mounting 18, and hence the second plurality of teeth 16, away from the portion of the housing 4 that the first end of the spring 22 is coupled to.

The operation of the assembly will now be described. In normal operation, the first and second plurality of teeth 6,16 are biased away from each other by the biasing member 22 such that they do not engage each other. The input shaft 2 is caused to rotate about its longitudinal axis, e.g. by a motor. This drives an output shaft or other component (not shown). For example, the input shaft 2 may be coupled to an output shaft such that rotation of the input shaft 2 drives rotation of the output shaft. Under normal operating conditions, there is relatively little resistance to rotation of the input shaft 2 and output shaft (or the other component) and so there is relatively little torque in the system. Damage to the components due to excessive torque therefore does not occur.

However, if the output shaft (or the other component) or the input shaft 2 experiences resistance to its rotation, then the torque in the output shaft (or the other component) or the input shaft 2 increases, as the input shaft 2 continues to be driven. The torque sensor 8 periodically or continuously senses the torque in the output shaft (or the other component) or the input shaft 2. Torque sensors are well known devices and so are not described further herein. When the torque sensor 8 detects that the torque has risen to a pre-selected threshold value, the controller 15 sends a signal to the voltage supply so as to supply an electrical current to the coil 12 of the electromagnet 10. The electromagnet 10 therefore generates a magnetic field that attracts the second teeth 16 and/or the mounting 18 with sufficient force to overcome the biasing force of the biasing member 22. The second teeth 16 and mounting 18 therefore move longitudinally along the input shaft 2 and into engagement with the first teeth 6 on the housing 4. The first and second teeth 6,16 therefore interlock. As the first teeth 6 are unable to rotate circumferentially relative to the housing 4 and the second teeth 16 are unable to rotate circumferentially relative to the input shaft 2, the engagement of the first teeth 6 with the second teeth 16 causes the input shaft 2 to stop rotating relative to the housing 4. The torque is therefore eliminated.

It will be appreciated that by arranging the plurality of first and second teeth 6,16 circumferentially, there are multiple contact points and hence the contact stresses are distributed. The first teeth 6 may be secured to the housing 4, for example, using a plurality of pins and bolts 24 (e.g. having cyclic symmetry) such that the forces are transmitted to the housing 4 over a plurality of points.

The electromagnet 10 remains activated, and the first and second teeth 6, 16 engaged, until the torque sensor 8 determines that the level of torque has reduced to a pre-selected threshold value; which may be the same, higher or lower than the pre-selected threshold value that caused the electromagnet to be activated. When the torque sensed by the sensor 8 has reduced to this value, the controller 15 controls the voltage supply so as to stop or reduce the current supplied to the electromagnetic coil 12. The biasing member 22 then pushes the second teeth 16 away from the first teeth 6 such that they are no longer engaged and so the input shaft 2 is able to be rotated again.

Various embodiments of the present disclosure provide an envelope and/or weight reduction for the assembly. The braking system described above is also easily controlled by applying a voltage to the electromagnet 10 and the threshold value(s) at which the breaking system activates and deactivates may be readily changeable. The system also adds little inertia to the rotating components.

Although the present disclosure has been described with reference to various embodiments, it will be understood by those skilled in the art that various changes in form and detail may be made without departing from the scope of the invention as set forth in the accompanying claims.

For example, the first and/or second teeth 6,16 may be provided in the form of a sun gear. The sun gear for the second teeth 16 may be movable longitudinally relative to the input shaft 2, but not circumferentially.

Alternatively, the second teeth 16 may form an integral part of the input shaft 2 and may not move relative thereto, either longitudinally or circumferentially. In this embodiment, the electromagnet 10 may cause longitudinal movement of the input shaft 2 to cause the second teeth 16 to engage with the first teeth 6.

Although embodiments have been described wherein second teeth 16 are movable relative to the input shaft 2 and the second teeth 16 are brought into engagement with the first teeth 6 by the magnetic field, it is alternatively contemplated that the first teeth 6 may be movable relative to the housing 4 and the first teeth 6 may be brought into engagement with the second teeth 16 by the magnetic field.

Although embodiments have been described wherein the first and second teeth 6,16 are moved relative to each other in a direction along the rotational axis of the input shaft 2 in order to engage each other, it is contemplated that the teeth 6,16 may alternatively be moved relative to each other in a radial direction relative to the input shaft 2 in order to engage each other.

Although embodiments have been described wherein first teeth 6 are brought into engagement with the second teeth 16 by the magnetic field, it is contemplated that alternatively the first and second teeth 6,16 may be substituted by members that are brought into frictional engagement by the magnetic field. For example, the first and second engagement members may be frictional pads. This may serve to either stop or slow the rotation of the input shaft 2 relative to the housing 4 to eliminate or reduce the torque in the system.

The invention claimed is:

1. A torque limiter assembly comprising:
   a non-rotating housing having at least one first engagement member;
   an input shaft that is rotatable relative to the housing and having at least one second engagement member, wherein the input shaft is mounted within the housing such that the input shaft extends through at least part of an opening in the housing;
   an electromagnet; and
   an annular spring arranged around the input shaft, configured to bias the at least one first engagement member away from the at least one second engagement member, wherein the annular spring is coupled at a first of its ends to the housing or to the at least one first engagement member, and at a second of its ends to the at least one second engagement member or the input shaft,
   wherein the electromagnet is arranged and configured such that when activated it generates a magnetic field that moves the at least one first engagement member relative to the at least one second engagement member, such that the first and second engagement members engage each other and stop or inhibit rotation of the input shaft relative to the housing, thereby braking the input shaft.

2. The assembly of claim 1, wherein the at least one first engagement member is at least one first projection mounted on the housing and/or wherein the at least one second engagement member is at least one second projection mounted on the input shaft.

3. The assembly of claim 2, wherein the at least one first projection projects in a first direction along a rotational axis of the input shaft and wherein the at least one second projection projects in a second opposite direction along the rotational axis of the input shaft.

4. The assembly of claim 2, wherein the at least one first projection and the at least one second projection are arranged at substantially a same radial distance from a rotational axis of the input shaft.

5. The assembly of claim 2, wherein the at least one first projection comprises a first plurality of projections arranged on the housing spaced circumferentially around a rotational axis of the input shaft, and/or wherein the at least one second projection comprises a second plurality of projections arranged on the input shaft spaced circumferentially around a rotational axis of the input shaft.

6. The assembly of claim 2, wherein the at least one first projection is a first plurality of teeth mounted on the housing, and wherein the at least one second projection is a second plurality of teeth mounted on the input shaft.

7. The assembly of claim 1, comprising a torque sensor for sensing the level of torque in the input shaft or in another component coupled to the input shaft, and a controller configured to activate the electromagnet when the level of torque sensed by the torque sensor rises to, or above, a pre-selected level.

8. The assembly of claim 7, wherein the controller is configured to deactivate the electromagnet when the level of torque sensed by the torque sensor decreases to, or below, a pre-selected level.

9. The assembly of claim 1, wherein the electromagnet comprises a wire coil arranged around the input shaft, and a magnetic material which the wire coil is wound around to concentrate the magnetic flux from the wire coil.

* * * * *